Aug. 29, 1939.  W. C. HEDGCOCK  2,171,514
BRAKE ARRANGEMENT
Filed April 6, 1936  2 Sheets-Sheet 1
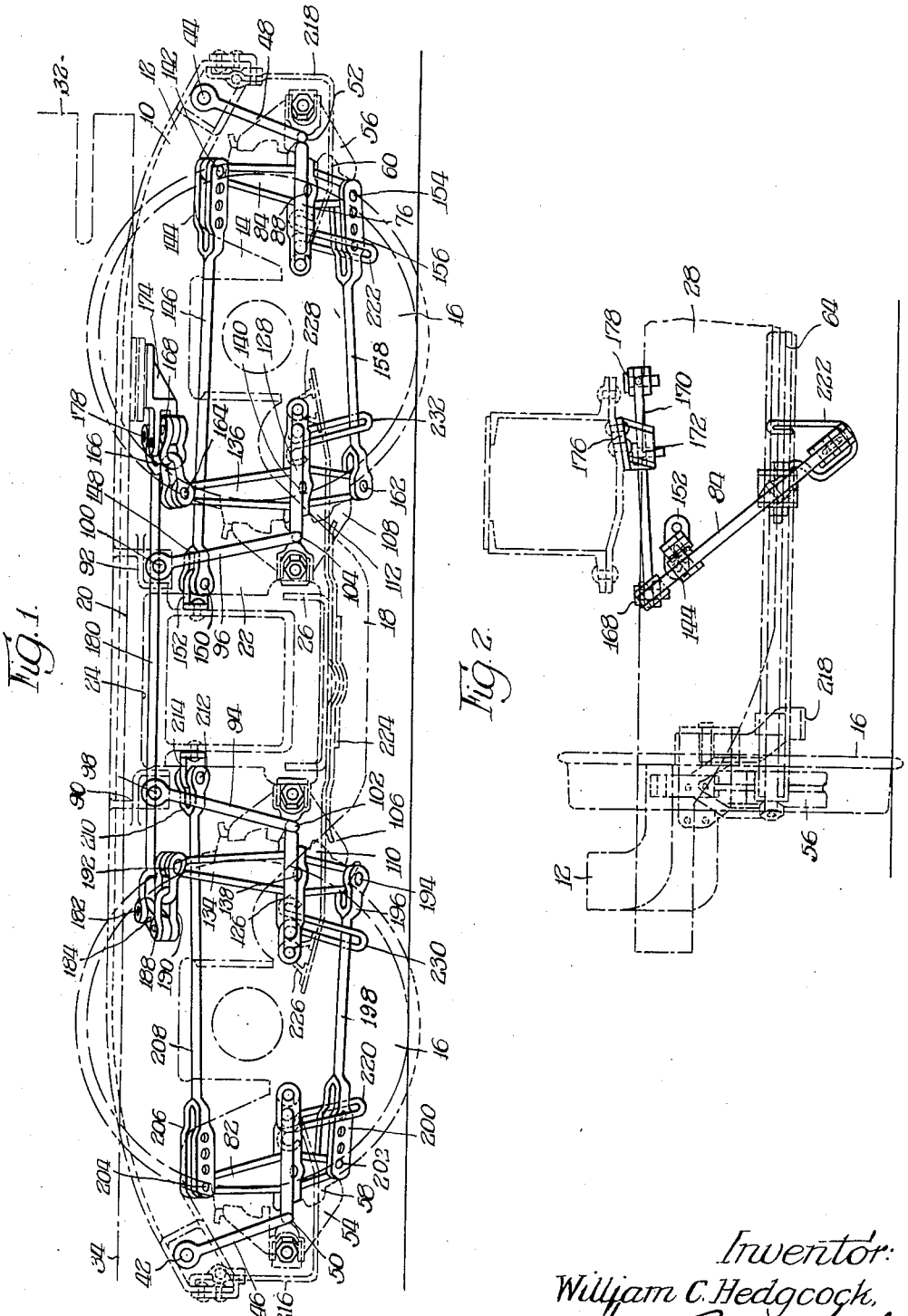
Inventor:
William C. Hedgcock,
By Wilkinson, Huxley, Byron & Knight
Attys.

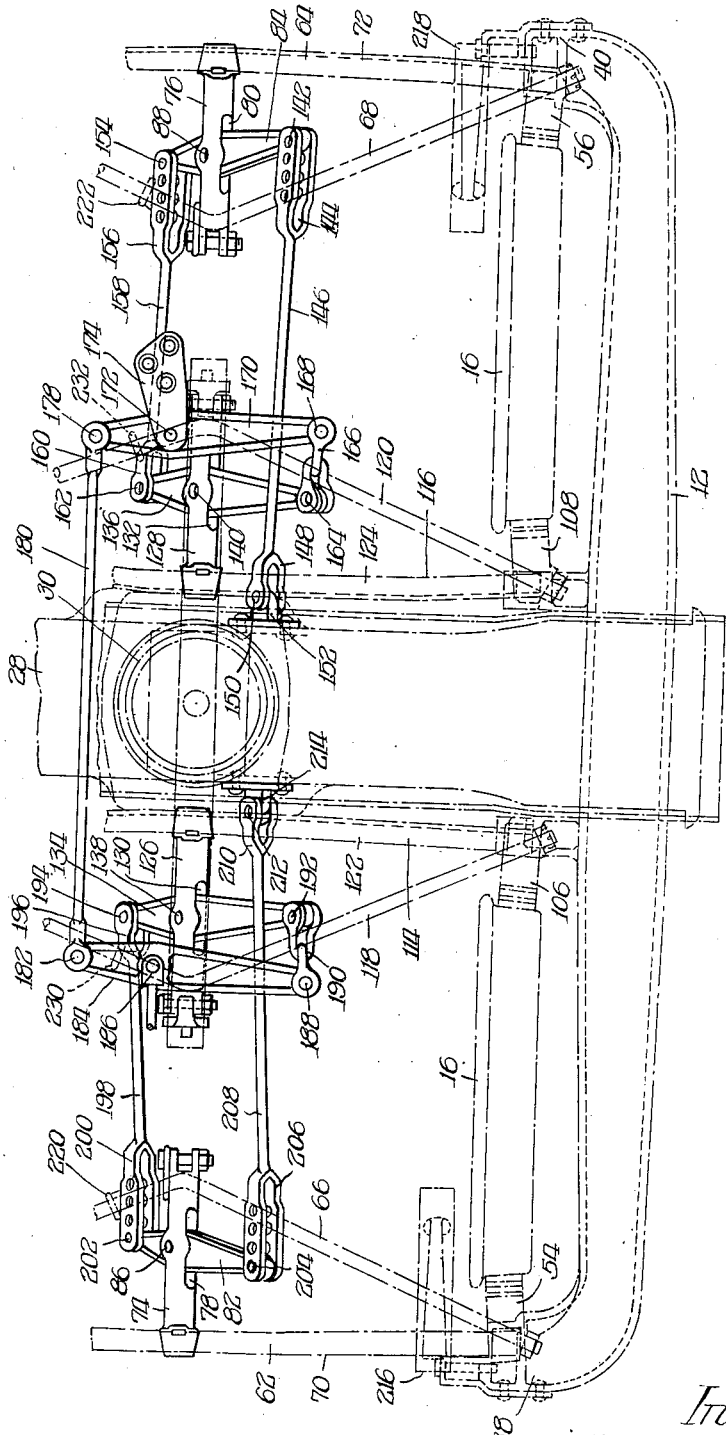

Patented Aug. 29, 1939

2,171,514

UNITED STATES PATENT OFFICE 2,171,514

BRAKE ARRANGEMENT

William C. Hedgcock, Wilmette, Ill., assignor to American Steel Foundries, Chicago, Ill., a corporation of New Jersey Application April 6, 1936, Serial No. 72,894

37 Claims. (Cl. 188—56)

This invention pertains to clasp brakes for railway car trucks.

An object of the invention is to provide clasp brakes for railway cars, particularly freight car trucks, which brakes are light, simple and efficient, and adapted for use with the standard A. R. A. brake beams.

Another object is to provide a clasp brake the parts of which are so arranged as to have freedom of movement and clearance of the car body and truck parts under all conditions of service, including conditions of oscillation of the truck parts during travel of the truck on straight or curved tracks.

Still another object is to provide a clasp brake which will not interfere with the car body during passage of cars through vertically curved tracks such as those used in connection with car dumping machines.

A further object is to provide a clasp brake arrangement in which all the connection rods are tension members, and in which clearances are maintained without undue angularity in the rods.

Still a further object is to provide a brake system for a car truck wherein connection can be had to body brake rigging to permit efficient and desirable proportions of said body brake rigging.

A yet further object is to provide a clasp brake in which no unbalanced reactions are transmitted therefrom to the truck bolster or other load carrying member, and wherein there is no tendency for braking forces to swivel the truck or misplace the load carrying member into rubbing engagement with the truck frame.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation of a car truck showing the clasp brake system applied thereto, the relation of the car body to the car truck being shown;

Figure 2 is a fragmentary transverse end elevation of the truck and brake arrangement illustrated in Figure 1, the same looking from the right of said figure;

Figure 3 is a fragmentary top plan view of the truck and brake construction illustrated in Figure 1.

Inasmuch as the brake arrangement at opposite sides of the truck is identical, only that at one side is described.

The truck 10 is shown of the four-wheel truck type including the side frame 12 provided with pedestals 14 adapted to have cooperative relation with suitable journal means (not shown) of the wheel and axle assemblies 16. The side frame shown is of the truss type and is provided with the tension member 18 and the compression member 20 connected adjacent the center thereof by means of the columns 22 forming a bolster opening or window 24. The spaced side frames are shown connected by the spring plank 26 and the bolster or load carrying member 28 is adapted to be received in said window and suitably supported therein, the bolster being provided with the center bearing 30 upon which the car body 32 is swiveled.

The underframe of said car body is provided with the center sills indicated generally at 34 terminating in the substantially box-shaped draft sills disposed adjacent the end of the car body. The ends of the truck frame are shown as provided with the brackets 38 and 40 for pivotal connection as at 42 and 44 with the brake hangers 46 and 48, said brake hangers pivotally supporting, as at 50 and 52, the end brake heads 54 and 56, said brake heads having suitable shoes 58 and 60 adapted to have braking cooperation with the outside periphery of the respective wheels. Opposite brake heads are connected by means of the standard A. R. A. type of brake beams 62 and 64, said brake beams consisting essentially of the tension members 66 and 68, and compression members 70 and 72 connected intermediate the ends thereof, and adjacent the longitudinal center line of the truck, by the fulcrums 74 and 76. Said fulcrums are slotted as at 78 and 80 for reception of the end truck levers 82 and 84 disposed substantially on a 40 deg. angle and being pivotally connected intermediate the ends thereof as at 86 and 88 to the respective fulcrums 74 and 76.

The truck frame 12 is also provided with the hanger brackets 90 and 92 disposed adjacent the window 24, and the brake hangers 94 and 96 are pivotally connected as at 98 and 100 to said brackets. The lower ends of said brake hangers are pivotally connected as at 102 and 104 to the inner brake heads 106 and 108, said brake heads being provided with suitable shoes 110 and 112 adapted to have braking cooperation with the inner periphery of said wheels. Opposite brake heads 106 and 108 are connected by means of the inner brake beams 114 and 116 likewise of the standard A. R. A. type including the tension members 118 and 120 and compression members 122 and 124. The tension and compression members of each of said brake beams are connected by means of the centrally disposed fulcrums 126 and 128 slotted as at 130 and 132 for reception of the inner truck levers 134 and 136 likewise disposed at substantially a 40 degree angle.

The inner truck levers 134 and 136 preferably are longer than the outer truck levers 82 and 84, the inner truck levers being pivotally connected as at 138 and 140 to the fulcrums 126 and 128 respectively. The upper end of the outer truck lever 84 is adjustably connected as at 142 to the jaw 144 of the pull rod 146, the inner end of said pull rod being provided with the jaw 148 pivotally connected as at 150 to the bracket 152 provided on the bolster 28. The lower end of the truck lever 84 is adjustably and pivotally connected as at 154 to the jaw 156 of the pull rod 158, the inner jaw 160 thereof being pivotally connected as at 162 to the lower end of the inner truck lever 136.

The upper end of said inner truck lever 136 is pivotally connected as at 164 to the clevis 166, said clevis being pivotally connected as at 168 to the substantially horizontal dead body lever 170. Said truck lever is pivotally connected as at 172 intermediate the ends of said lever to the fulcrum bracket 174, said bracket being supported as at 176 to the draft or center sills or draft gear carrier of the car body. The other end of said dead body lever 170 is pivotally connected as at 178 to one end of the pull rod 180. Said pull rod extends above the bolster and is pivotally connected adjacent the other end thereof as at 182 to one end of the live body or brake lever 184, said body lever being slidably supported on suitable brackets (not shown) provided on the car body or center sill.

The live body lever 184 is preferably of different proportions than the dead body lever 170, the proportions of said lever not being confined to a one-to-one ratio, thus permitting a choice of the location and the intensity of the force to be applied by the brake operating mechanism at the pivot point 186 of the live body lever 184, the pivot point 186 being the point of connection to the body brake operating mechanism. The opposite end of the live body lever 184 is pivotally connected as at 188 to the clevis 190, said clevis being pivotally connected as at 192 to the upper end of the inner truck lever 134. The lower end of the truck lever 134 is pivotally connected as at 194 to the jaw 196 of the pull rod 198. The outer end of said pull rod 198 is provided with the jaw 200 pivotally and adjustably connected as at 202 to the lower end of the outer truck lever 82. The upper end of the truck lever 82 is pivotally and adjustably connected as at 204 to the jaw 206 provided on the pull rod 208.

The pull rod 208 is preferably substantially in alignment with the pull rod 146 and is provided with the inner jaw 210 pivotally connected as at 212 to the bolster bracket 214, the brackets 214 and 152 being in substantial alignment. Thus, as the forces on the rods 208 and 146 are of equal intensity and in opposite directions and in the same plane, they neutralize each other so that no unbalanced force is exerted against the truck bolster. As the other dead truck lever reaction is on the bracket 174 secured to the frame of the car body, there are no forces within the truck tending to swivel the same to cause flange wear, or tending to pull the truck bolster against the column guides of the side frame to cause wear.

Safety means is provided for the brake rigging which may take the form of auxiliary supports 216 and 218 depending from and attached to the side frames adjacent the ends thereof. Safety guards 220 and 222 are also provided for the pull rods 198 and 158, said guards being supported on the end brake beams 62 and 64 and underlying said pull rods in embracing relation thereto. The spring plank 26 may also be provided with brake beam safety means 224 underlying the inner brake beams 114 and 116, said inner brake beams being provided with pivoted shoes 226 and 228 supported on said safety means. The inner brake beams may also be provided with safety guards 230 and 232 underlying the inner ends of the tension rods 198 and 158.

In operation of this brake arrangement, assuming the brakes to be in released condition, operation of the brake mechanism on the car body moves the live body lever 184 toward the left as viewed in Figure 3. The pull rod 180 thus moves the dead body lever 170 in a counterclockwise direction, moving the upper end of the inner brake lever 136 toward the rights as viewed in said figure. Movement of said brake lever end toward the right will move the brake beam 116 to apply the inner brake shoes. Continued movement causes the track lever 136 to be moved in a counter-clockwise (Fig. 3) direction about the pivot point 140, causing the pull rod 158 to rotate the outer truck lever 84 about its pivot 142 to apply the outer brake beam 64. Movement of the live body lever 184 also causes the upper end of the inner truck lever 134 to be moved toward the left, moving the inner brake beam 114 to apply the brake shoes.

Continued movement of the brake rigging causes the lower end of the inner truck lever 134 to move the pull rod 198 toward the right, thus causing rotation of the outer truck lever 82 about the pivot 204 to apply the brake shoes of the outer brake beam 62. Release of the brake rigging is of course in an opposite direction. In this type of brake rigging the standard A. R. A. brake beams may be used permitting the use of centrally disposed truck levers. In this location they are directly beneath the car body underframe, and are kept low to clear the latter in all conditions of movement, curvature and oscillation.

Operation of cars on vertically curved tracks such as used in dumping machines, causes the ends of the truck to tilt up toward the underframe and therefore considerable vertical clearance is demanded. With the use of shorter outer truck levers, ample clearance is provided and angular movement thereof is less. By the nature of this brake arrangement the upper ends of both live truck levers 134 and 136 move outwardly from the transverse truck center when the brakes are applied. This diverse movement of the live truck levers is combined into a unitary movement at the connection 186 by the combination of the levers 170 and 184 and their pull rod 180. The arrangement of the truck levers and pull rod also provides effective means of transmitting brake forces around the center plate 30 without interference therewith, and without resort to angularly inclined rods which are not desirable.

It is to be understood that I do not wish to be limited by the exact embodiment of the device shown, which is merely by way of illustration and not limitation, as various and other forms of the device will of course be apparent to those skilled in the art without deporting from the spirit of the invention or the scope of the claims.

I claim:

1. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, the upper end of each of the outer of said levers being connected to said load carrying member, a connection between the lower ends of pairs of said truck levers, body levers disposed on opposite sides of said load carrying member and having one end thereof connected to the opposite end of the adjacent truck lever, and a connection between the other ends of said body levers, one of said body levers being pivoted intermediate its ends to said car body, the other of said body levers being adapted to be connected intermediate the ends thereof to brake operating means.

2. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, substantially aligned pull rods each having one end thereof connected to said load carrying member and having the other end thereof connected to the upper end of the adjacent outer truck lever, a connection between the lower ends of pairs of said truck levers, body levers disposed on opposite sides of said load carrying member and having one end thereof connected to the opposite end of the adjacent inner truck lever, and a connection between the other ends of said body levers, one of said body levers being pivoted intermediate its ends to said car body, the other of said body levers being adapted to be connected intermediate the ends thereof to brake operating means.

3. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, the upper end of each of the outer of said levers being connected to said load carrying member, a connection between the lower ends of pairs of said truck levers, body levers disposed on opposite sides of said load carrying member and having one end thereof connected to the opposite end of the adjacent inner truck lever, and a connection between the other ends of said body levers, one of said body levers being a dead lever, the other of said body levers being a live lever and being adapted to be connected intermediate the ends thereof to brake operating means.

4. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, the upper end of each of the outer of said levers being connected to said load carrying member, a connection between the lower ends of pairs of said truck levers, body levers disposed on opposite sides of said load carrying member and having one end thereof connected to the opposite end of the adjacent truck lever, and a pull rod extending above said load carrying member and connected to the other ends of said body levers, one of said body levers being pivoted intermediate its ends to said car body, the other of said body levers being adapted to be connected intermediate the ends thereof to brake operating means.

5. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, the upper end of each of the outer of said levers being connected to said load carrying members, a connection between the lower ends of pairs of said truck levers, body levers disposed on opposite sides of said load carrying member and having one end thereof connected to the opposite end of the adjacent inner truck lever, and a pull rod extending above said load carrying member and connected to the other ends of said body levers, one of said body levers being a dead lever, the other of said body levers being a live lever and being adapted to be connected intermediate the ends thereof to brake operating means.

6. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, substantially aligned pull rods each having one end thereof connected to said load carrying member and having the other end thereof connected to the upper end of the adjacent outer truck lever, a connection between the lower ends of pairs of said truck levers, body levers disposed on opposite sides of said load carrying member and having one end thereof connected to the opposite end of the adjacent inner truck lever, and a pull rod extending above said load carrying member and connected to the other ends of said body levers, one of said body levers being pivoted intermediate its ends to said car body, the other of said body levers being adapted to be connected intermediate the ends thereof to brake operating means.

7. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, the upper end of one of said truck levers on each side of said load carrying member being connected to said load carrying member, a connection between the lower ends of pairs of said truck levers, a body lever disposed on each side of said load carrying member, one end of each of said body levers being connected to the other of the truck levers, a connection between said body levers, and operating means connected to one of said body levers.

8. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, substantially aligned pull rods each having one end thereof connected to said load carrying member and having the other end thereof connected to the upper end of one of said truck levers, a connection between the lower ends of pairs of said truck levers, and brake operating means connected to the other of said truck levers.

9. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed outer dead truck levers disposed at each end of said truck and pivotally connected to the outer brake beams, centrally disposed inner live truck levers pivotally connected to each of the inner brake beams, a connection between pairs of inner and outer truck levers disposed below the wheel centers, a connection between live truck levers extending above said load carrying member, and operating means for said brake arrangement.

10. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, a pull rod connecting pairs of said truck levers, connecting means between a truck lever of each pair of truck levers and connected to said truck levers adjacent the ends thereof on the same side of the longitudinal center line of the truck, the corresponding truck lever of each pair being a dead lever, and the other truck levers being live levers, and operating means for said brake arrangement.

11. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed outer dead truck levers disposed at each end of said truck and pivotally connected to the outer brake beams, centrally disposed inner live truck levers pivotally connected to each of the inner brake beams, a connection between pairs of inner and outer truck levers, a connection between live truck levers on the same side of the longitudinal center line of the truck, and operating means for said brake arrangement.

12. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, a pull rod connecting pairs of said truck levers, connecting means between a truck lever of each pair of truck levers on the same side of the longitudinal center line of the truck, the corresponding truck lever of each pair being a dead lever, and the other truck levers being live levers, said dead truck levers and said live truck levers being of different size, and operating means for said brake arrangement.

13. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, said outer truck levers being dead levers and said inner truck levers being live levers, a pull rod connecting pairs of said truck levers, connecting means between the live truck levers on the same side of the longitudinal center line of the truck, said dead truck levers being shorter than said live levers, and operating means for said brake arrangement.

14. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, a pull rod connecting pairs of said truck levers, connecting means between a truck lever of each pair of truck levers, the corresponding truck lever of each pair being a dead lever, and the other truck levers being live levers, said connecting means being connected to said truck levers on the same side of the longitudinal center line of the truck, including dead and live body levers of different proportion, and operating means connected to said live body levers.

15. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, said truck levers connected to said inner brake beams being live levers and said truck levers connected to said outer brake beams being dead levers, a pull rod connecting pairs of said truck levers, connecting means between a live truck lever of each pair of truck levers, the connections of said dead truck levers to said truck frame being so constructed and arranged as to neutralize the reactions of each.

16. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed outer dead truck levers disposed at each end of said truck and pivotally connected to the outer brake beams, centrally disposed inner live truck levers pivotally connected to each of the inner brake beams, a connection between pairs of inner and outer truck levers disposed below the wheel centers, a connection between live truck levers, said connection including a dead body lever pivoted to said car body to provide a pair of arms, one of said arms being connected to one of the live truck levers, a live body lever, operating means connected to said live body lever intermediate its ends to provide a pair of arms, one of said last-named arms being connected to the other live truck lever, a connection between the other arms of said live and dead body levers, the arms of said live and dead body levers being of unequal ratio.

17. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, brake hangers supported on said side frames and connected to said beams adjacent the ends thereof, inner and outer truck levers disposed substantially on the longitudinal center line of said truck and respectively connected to the inner and outer of said brake beams intermediate the ends of said levers, pull rods each having one end thereof connected to said load carrying member and having the other end thereof connected to the upper end of the adjacent outer truck lever, and connections of said pull rods to said load carrying member being in substantially horizontal alignment, a connection between the lower ends of pairs of said truck levers, body levers disposed on opposite sides of said load carrying member and having one end thereof connected to the opposite end of the adjacent inner truck lever, and a pull rod extending above said load carrying member and connected to the other ends of said body levers, one of said body levers being pivoted intermediate its ends to said car body, the other of said body levers being adapted to be connected intermediate the ends thereof to brake operating means.

18. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, inner and outer truck levers disposed substantially on the longitudinal center line of said truck and respectively connected to the inner and outer of said brake beams intermediate the ends of said levers, pull rods each having one end thereof connected to said load carrying member and having the other end thereof connected to the upper end of the adjacent outer truck lever, the connections of said pull rods to said load carrying member being in substantially horizontal alignment, a connection between the lower ends of pairs of said truck levers, body levers disposed on opposite sides of said load carrying member and having one end thereof connected to the opposite end of the adjacent inner truck lever, and a pull rod extending above said load carrying member and connected to the other ends of said body levers, one of said body levers being pivoted intermediate its ends to said car body, the other of said body levers being adapted to be connected intermediate the ends thereof to brake operating means.

19. In a brake arrangement, the combination of a truck, a car body supported thereon, said truck including spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, inner and outer truck levers disposed substantially on the longitudinal center line of said truck and respectively connected to the inner and outer of said brake beams intermediate the ends of said levers, pull rods each having one end thereof connected to said load carrying member and having the other end thereof connected to the upper end of the adjacent outer truck lever, the connections of said pull rods to said load carrying member being in substantially horizontal alignment, a connection between the lower ends of pairs of said truck levers, body levers disposed on opposite sides of said load carrying member and having one end thereof connected to the opposite end of the adjacent inner truck lever, and a pull rod connected to the other ends of said body levers, one of said body levers being pivoted intermediate its ends to said car body, the other of said body levers being adapted to be connected intermediate the ends thereof to brake operating means.

20. In a brake arrangement for trucks, the combination of spaced wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, a connection between pairs of inner and outer truck levers, a connection between a truck lever of each pair of truck levers, said last-named connection including a dead lever pivoted at a fixed point intermediate the ends thereof, a live lever, and operating means connected to said live lever intermediate the ends thereof.

21. In a brake arrangement for trucks, the combination of spaced wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, a connection between pairs of inner and outer truck levers, a connection between a truck lever of each pair of truck levers, means disposed in substantial alignment for connecting corresponding ends of said outer truck levers, said connection between pairs of inner and outer truck levers including a live lever, and operating means connected to said live lever intermediate the ends thereof.

22. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, said truck levers connected to said outer brake beams having substantially aligned connections to said load carrying member, a connection between pairs of inner and outer truck levers, and means for operating said truck levers.

23. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, corresponding truck levers of each pair of truck levers having substantially aligned connections to said load carrying member, a connection between pairs of inner and outer truck levers, and means for operating said truck levers.

24. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, corresponding truck levers of each pair of truck levers having substantially aligned connections to said load carrying member, a connection between pairs of inner and outer truck levers, a connection between a truck lever of each pair of truck levers, said last-named connection including a dead lever pivoted at a fixed point intermediate the ends thereof, a live lever, and operating means connected to said live lever intermediate the ends thereof.

25. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, said truck levers connected to said outer brake beams having substantially aligned connections to said load carrying member, a connection between pairs of inner and outer truck levers, a connection between a truck lever of each pair of truck levers, said last-named connection including a dead lever pivoted at a fixed point intermediate the ends thereof, a live lever, and operating means connected to said live lever intermediate the ends thereof.

26. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, corresponding truck levers of each pair of truck levers being connected adjacent an end thereof to said load carrying member disposed in substantial alignment, a connection between pairs of inner and outer truck levers, and means for operating said truck levers.

27. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, corresponding truck levers of each pair of truck levers being connected adjacent an end thereof to said load carrying member disposed in substantial alignment, a connection between pairs of inner and outer truck levers, a connection between a truck lever of each pair of truck levers, said last-named connection including a dead lever pivoted at a fixed point intermediate the ends thereof, a live lever, and operating means connected to said live lever intermediate the ends thereof.

28. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, said truck levers connected to said outer brake beams being connected adjacent an end thereof to said load carrying member disposed in substantial alignment, a connection between pairs of inner and outer truck levers, and means for operating said truck levers.

29. In a brake arrangement for trucks, the combination of spaced wheel and axle assemblies, spaced truck frames supported thereon, a transversely extending load carrying member supported on said truck frames between said wheel and axle assemblies, brake heads for each side of each wheel, transversely extending brake beams disposed on opposite sides of each wheel and axle assembly and connecting opposite brake heads, centrally disposed truck levers pivotally connected to each inner and outer brake beam, said truck levers connected to said outer brake beams being connected adjacent an end thereof to said load carrying member disposed in substantial alignment, a connection between pairs of inner and outer truck levers, a connection between a truck lever of each pair of truck levers, said last-named connection including a dead lever pivoted at a fixed point intermediate the ends thereof, a live lever, and operating means connected to said live lever intermediate the ends thereof.

30. In a brake arrangement for trucks, the combination of spaced truck levers centrally disposed with respect to the longitudinal center line of the truck, and means for operating said levers, said means comprising spaced levers interconnected adjacent one end thereof, one of said levers being pivoted at a fixed point intermediate the ends thereof and the other of said levers being connected to brake operating means intermediate the ends thereof, said last-named levers being connected adjacent the other end thereof to said first-named levers.

31. In a brake arrangement for trucks, the combination of spaced wheel and axle assemblies, spaced truck frames supported thereon, a transversely extending load carrying member supported by said truck frames, brake means including a dead and a live truck lever for each of said wheel and axle assemblies, and means connecting said dead truck levers to said load carrying member in such a way that the reactions of said dead truck levers are neutralized, and means for operating said brake means.

32. In a brake arrangement for trucks, the combination of spaced wheel and axle assemblies, spaced truck frames supported thereon, a transversely extending load carrying member supported by said truck frames, brake means including brake beams disposed on opposite sides of each wheel and axle assembly, a plurality of truck levers disposed substantially at the longitudinal center line of said truck, certain of said levers being dead levers and being pivotally connected to the outer of said brake beams, certain other of said levers being live levers and being pivotally connected to the inner of said brake beams, and means connecting said dead truck levers to said load carrying member whereby the reactions of said dead truck levers are neutralized, and means for operating said brake means.

33. In a brake arrangement for trucks, the combination of spaced wheel and axle assemblies, spaced truck frames supported thereon, a transversely extending load carrying member supported by said truck frames, said load carrying member having a center bearing means, brake means including a dead and a live truck lever for each of said wheel and axle assemblies, a dead body lever associated with one pair of live and dead truck levers, a live body lever associated with another pair of live and dead truck levers, a connection between said live and dead body levers passing over said load carrying member and around said center bearing means, and means for operating said brake means.

34. In a brake arrangement for trucks, the combination of spaced wheel and axle assemblies, spaced truck frames supported thereon, a transversely extending load carrying member supported by said truck frames, said load carrying member having a center bearing means, brake means including a dead and a live truck lever for each of said wheel and axle assemblies, means connecting said dead truck levers to said load carrying member whereby the reactions of said dead truck levers are neutralized, a dead body lever associated with one pair of live and dead truck levers, a live body lever associated with another pair of live and dead truck levers, a connection between said live and dead body levers passing over said load carrying member and around said center bearing means, and means for operating said brake means.

35. In a brake arrangement for trucks, the combination of spaced wheel and axle assemblies, spaced truck frames supported thereon, a transversely extending load carrying member supported by said truck frames, said load carrying member having a center bearing means, brake means including brake beams disposed on opposite sides of each wheel and axle assembly, a plurality of truck levers disposed substantially at the longitudinal center line of said truck, certain of said levers being dead levers and being pivotally connected to the outer of said brake beams, certain other of said levers being live levers and being pivotally connected to the inner of said brake beams, a dead body lever associated with one pair of live and dead truck levers, a live body lever associated with another pair of live and dead truck levers, a connection between said live and dead body levers passing over said load carrying member and around said center bearing means, and means for operating said brake means.

36. In a brake arrangement for trucks, the combination of spaced wheel and axle assemblies, spaced truck frames supported thereon, a transversely extending load carrying member supported by said truck frames, a car body, said load carrying member having a center bearing means, brake means including a dead and a live truck lever for each of said wheel and axle assemblies, a dead body lever mounted on said car body and associated with one pair of live and dead truck levers, a live body lever associated with another pair of live and dead truck levers, a connection between said live and dead body levers passing over said load carrying member and around said center bearing means, and means for operating said brake means.

37. In a brake arrangement for trucks, the combination of spaced wheel and axle assemblies, spaced truck frames supported thereon, a transversely extending load carrying member supported by said truck frames, a car body, said load carrying member having a center bearing means, brake means including a dead and a live truck lever for each of said wheel and axle assemblies, means connecting said dead truck levers to said load carrying member whereby the reactions of said dead truck levers are neutralized, a dead body lever mounted on said car body and associated with one pair of live and dead truck levers, a live body lever associated with another pair of live and dead truck levers, a connection between said live and dead body levers passing over said load carrying member and around said center bearing means, and means for operating said brake means.

WILLIAM C. HEDGCOCK.